No. 845,299. PATENTED FEB. 26, 1907.
K. P. HANGL.
FEEDER FOR BRIQUET MACHINES.
APPLICATION FILED APR. 5, 1906.
2 SHEETS—SHEET 1.
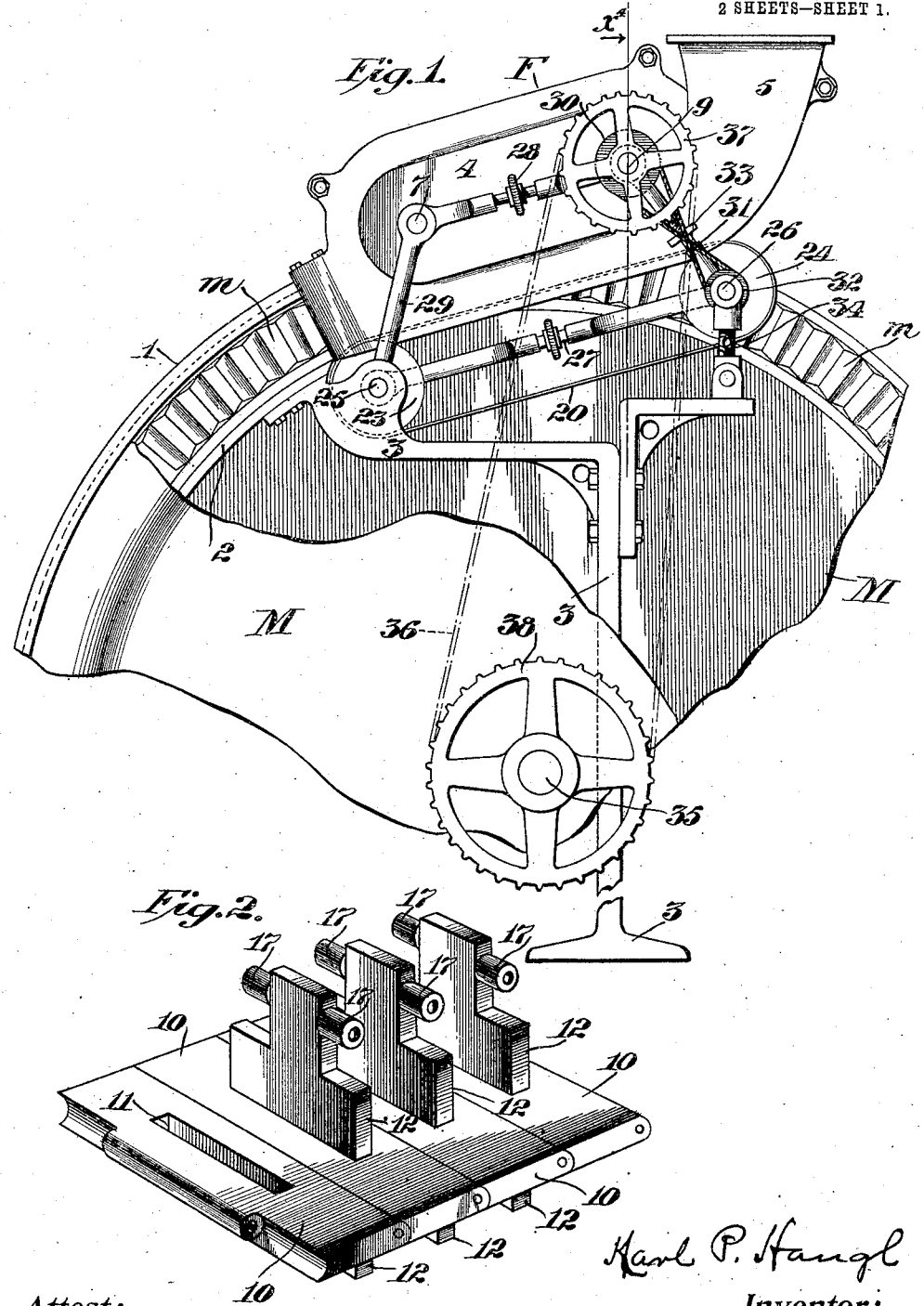
Attest:
Inventor:
Karl P. Hangl
by Henry Bennett
Atty.

No. 845,299. PATENTED FEB. 26, 1907.
K. P. HANGL.
FEEDER FOR BRIQUET MACHINES.
APPLICATION FILED APR. 5, 1906.
2 SHEETS—SHEET 2.
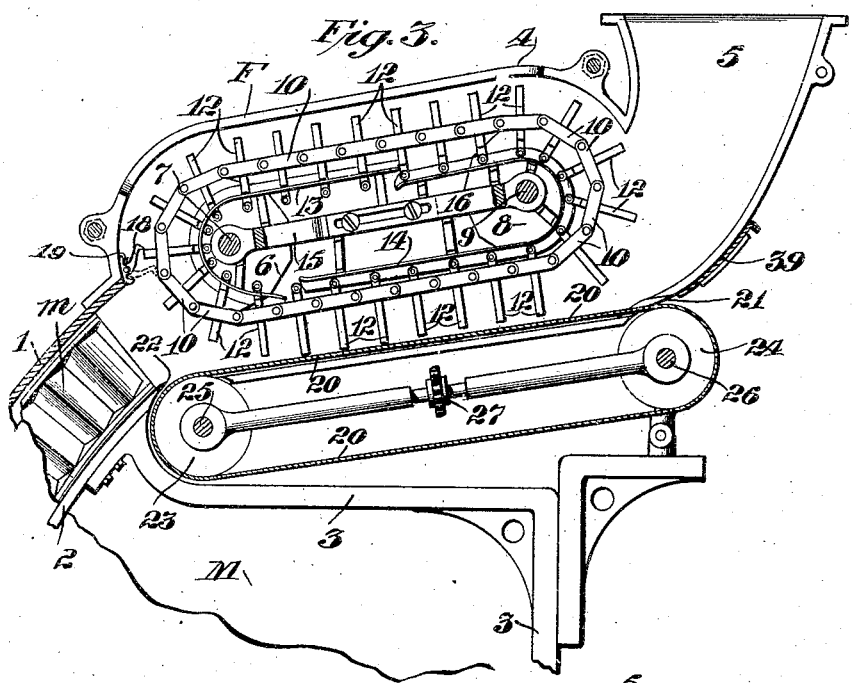
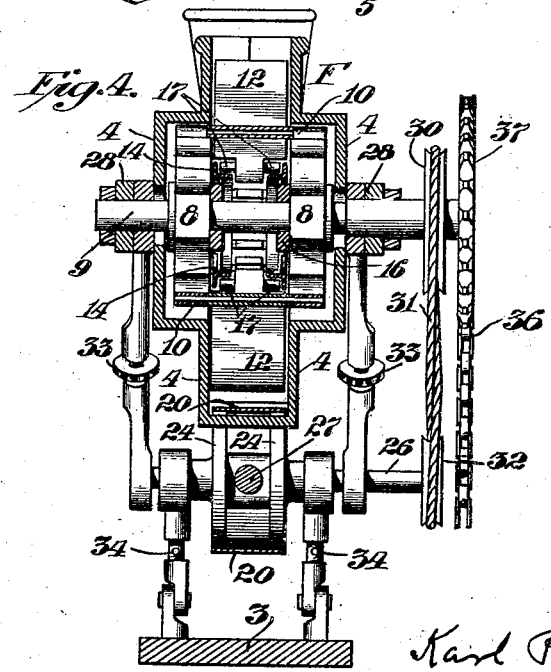
Attest:
Inventor:
Karl P. Hangl
by Henry Connett
Atty.

UNITED STATES PATENT OFFICE.

KARL P. HANGL, OF NEW YORK, N. Y.

FEEDER FOR BRIQUET-MACHINES.

No. 845,299. Specification of Letters Patent. Patented Feb. 26, 1907.

Application filed April 5, 1906. Serial No. 310,052.

*To all whom it may concern:*

Be it known that I, KARL P. HANGL, a citizen of the United States, residing in the borough of the Bronx, in the city and State of New York, have invented certain new and useful Improvements in Feeders for Briquet-Machines, of which the following is a specification.

This invention relates to means or mechanism for feeding plastic material to rotating or continuous machines or devices for molding briquets. A type of this class of machines is illustrated in United States Patent No. 712,735. In some machines of this general type the mold-wheels somewhat resemble bevel-gears and the molds are disposed in a circle on the peripheries of the wheels, the latter rotating on axes of such relative obliquity as to bring the half-molds on the respective wheels together at one point so as to compress the material gradually. As the mold-wheels continue to revolve the molds open and permit the briquets to fall out. The axes of the mold-wheels may be so disposed as to put the molding-point where the wheels tangent or come together higher or lower, as desired. In the patent named above this molding-point is shown to be in the same horizontal plane with the centers of the wheels. To feed the plastic material to such machines has been found very difficult, and this feeding operation is the more difficult where the binder used in the briquet is of a plastic sticky nature and is softened by heat, the material being fed to the molds while hot.

The present invention does not relate to the molding-machine, but solely to the feeder for feeding the plastic material or mixture to the molds.

The object of the feeder is to take the material from a suitable receptacle or hopper, segregate or partially separate it into blocks or masses each of the proper size to fill a mold, and to feed these masses in succession to the molds as the mold-wheels rotate. The blocks or segregated masses will be practically uniform in bulk, and the feeder must be run at the same speed as the mold-wheels in order that the separated or partially-separated masses may be delivered in proper succession to the molds.

In the accompanying drawings, which illustrate the invention as used in connection with a briquet-machine of substantially the type described above, Figure 1 is a side elevation of the feeder on a relatively small scale, parts of the mold-wheels being shown for illustration. Fig. 2 is an enlarged detail view of a part of the endless blade-carrying chain. Fig. 3 is a vertical axial section of the feeder on a larger scale than Fig. 1. Fig. 4 is a transverse vertical section taken substantially at line $x^4$ in Fig. 1, but drawn to the same scale as Fig. 3.

In the said drawings, M designates the two mold-wheels, and $m$ the molds in the faces thereof. As seen in plan, there will be a triangular space between the conveying-wheel rims, where the rings of the half-molds are situated.

F designates the feeder as a whole, and Fig. 1 shows the situation of the feeder in relation to the mold-wheels. The triangular space between the mold-wheels from the discharging end of the feeder down to the molding-point is covered exteriorly by a curved plate 1 and interiorly by a similar plate 2, secured to a support 3, on which the feeder is mounted.

The feeder will now be specifically described. A casing 4, provided with a suitable hopper 5 to receive the material to be molded into briquets, has mounted in it two pairs of wheels carrying an endless chain belt. The pair of wheels 6 are rotatable on a shaft or arbor 7, fixed in the casing, and the other pair of wheels 8 are fixed on a driving-shaft 9, which extends out through slightly slotted or enlarged apertures in the sides of the casing. The wheels 6 and 8 are polygonal, and the endless chain belt 10 is made up of hinge-like links (see Fig. 2) with close joints. The links of the chain fit the facets on the wheels, and the chain belt is thereby positively driven. Each link of the belt has in it a mortise-like aperture 11, (see Fig. 2,) through or in which plays a blade 12. These blades fit snugly in the apertures 11, and that portion of the blade which at any time may project operatively from the outer surface of the chain plays along a channel in the casing 4 below or beneath the chain, fitting said channel laterally very closely. Within the space inclosed by the chain and between the pairs of chain-wheels are two camways 13 and 14, supported, respectively, on telescoping or overlapping bars 15 and 16, extending between the arbor 7 and shaft 9. These camways are each of a general U-shape or form and overlap at their meeting ends. The camway 13 at the left is for drawing in the blades 12, and that at the right, or toward the hopper 2, is for protruding the blades. To enable the camways to actuate the blades, each of the latter has a lug at its inner end, and in this lug a rod or spindle forming journals and carrying on its respective journals rollers 17, which roll on the camways. For convenience each camway may be slitted throughout its length, by which slit it is practically divided into a pair, the lug on the blade playing along said slot or space. Thus as the operating-blades are carried along—from right to left in Fig. 3—they are protruded into the plastic mass from the hopper and carry the material therein along to the delivery-point of the feeder, partially separating it into masses of the proper size to form each a briquet, and carrying these masses along with a speed corresponding to that of the mold-wheels. As the blades approach the discharging end of the feeder they are gradually drawn inward by the camway 13 and are thus freed from the mass of material. As the blade withdraws from the mass it strikes a hinged scraper 18, mounted on the casing, and backed by a spring 19. This scraper swings back under the pressure of the moving blade and draws over the latter, scraping the material from its face. When the blade passes, the scraper is advanced by its spring again and engages the next succeeding blade.

In order that the plastic mass carried from the hopper by the blades may not have to move over the stationary surface forming the bottom of the casing 4, an endless apron 20 is provided. This apron at its upper side passes through slits in the casing 4 at 21 and 22 and moves just above the bottom of the casing. This apron, which may be of thin metal, as steel, is mounted on two pairs of wheels 23 and 24, the former being secured on an arbor 25, which has bearings in the support 3, and the latter is secured on a shaft 26. There is a stretcher 27 between the arbor 25 and shaft 26 for tightening the apron 20.

There are two stretchers 28 between the arbor 7 and shaft 9 to maintain the chain belt 10 taut, and links 29 connecting the arbor 7 with the arbor 25. These (see Figs. 1 and 4) are exterior to the casing. Also exterior to the casing at one side is a sheave 30 on the shaft 9, and a cross-belt 31 connects this sheave with a sheave 32 on the shaft 26. There are stretchers 33 between the shafts 9 and 26 to keep the cross-belt tight. The shaft 26 has bearings in the upper ends of stretchers 34, hinged at their lower ends to the support 3. These latter enable the shaft 9 to be raised in the casing 4 so as to cause the protruding ends of the blades to dip more or less deeply into the mass of briquet material at that end. In Fig. 3 it will be noted that the lower side of the chain belt is very nearly parallel with the endless apron 20; but by means of the stretchers 34 the shaft 9 may be raised to a limited extent, so that the blades at the right in Fig. 3 will not penetrate so deeply.

The shaft 9 is driven from the mold-wheels by the means shown in Figs. 1 and 4. Sprocket-wheels 37 and 38, respectively, on the shaft 9 and a shaft 35 of one of the mold-wheels are connected by an ordinary chain 36. (Seen in dotted lines in Fig. 1.) Any suitable positive means for driving the feeder in unison with the mold-wheels may be employed.

It will be noted that the feeder discharges the masses of material into the space above the molding-point, which space is inclosed laterally by the two converging mold-rings on the wheels, the outer curved plate 1 and the inner curved plate 2, and obviously the path along which the blades 12 feed the masses of material may have any desired angle with a plane tangent to the circle in which the molds travel.

There may be a wicket or slide 39 to close or partly close the aperture or slit 21 where the apron 20 enters the casing 4. The invention is not limited strictly to the details of mechanism herein shown, as these may be varied to some extent without departing from the invention in any material degree.

As herein shown, the casing 4 is cast in two sections and is open at the top to offer access to the blades and chain for inspection and repair.

Having thus described my invention, I claim—

1. A feeder for the purpose specified, having a casing open to receive the plastic material at one end and open to discharge said material at the other end, supporting-wheels rotatively mounted in said casing, an endless chain belt on and driven by said supporting-wheels, said belt being composed of links and the links having in them mortises, segregating-blades which play in and out in said mortises as guide-bearings, means for protruding and drawing in said blades at proper points in the travel of the chain belt and means for driving said chain belt.

2. A feeder for the purpose specified, having a casing open to receive the plastic material at one end and open to discharge said material at the other end, supporting-wheels rotatively mounted in said casing, an endless chain belt on and driven by said supporting-wheels, said belt being composed of links and the links having in them mortises, segregating-blades which play in and out in said mortises as guide-bearings, means for protruding and drawing in said blades at proper points in the travel of the chain belt, means for driving said chain belt, an endless apron below said chain belt to assist in moving the material, and means for carrying and driving said apron.

3. A feeder for the purpose specified, having a casing open at one end to receive the plastic material and open at the other end for the discharge of the same, an endless series of blades for segregating the material in said casing and moving it to the discharging end thereof, means for carrying and operating said blades, an endless apron below said blades to assist in feeding the segregated material, means for supporting and driving said apron, and means for raising and lowering the blades, with respect to said apron, at the receiving end of said casing.

4. In a feeder for the purpose specified, the combination with a casing 4, provided at its receiving end with a hopper, of the pairs of wheels 6 and 8 mounted in said casing, the chain belt 10 mounted on and driven by said wheels, the blades 12 mounted slidably in mortises in the links of said chain belt, the camways 13 and 14 for moving said blades in and out, the endless apron 20 below said blades, means for supporting said apron, and means for driving said blades and apron at corresponding speeds in the same direction.

In witness whereof I have hereunto signed my name, this 4th day of April, 1906, in the presence of two subscribing witnesses.

KARL P. HANGL.

Witnesses:
  H. G. HOSE,
  WILLIAM J. FIRTH.